United States Patent
Goermer et al.

(10) Patent No.: US 9,654,646 B2
(45) Date of Patent: May 16, 2017

(54) PROXIMITY SERVICE CHARGING

(71) Applicant: NOKIA SOLUTIONS AND NETWORKS OY, Espoo (FI)

(72) Inventors: Gerald Goermer, Wandlitz (DE); Vesa Pauli Hellgren, Helsinki (FI); Li Zhu, Willetton (AU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/430,392

(22) PCT Filed: Sep. 24, 2012

(86) PCT No.: PCT/EP2012/068724
§ 371 (c)(1),
(2) Date: Mar. 23, 2015

(87) PCT Pub. No.: WO2014/044326
PCT Pub. Date: Mar. 27, 2014

(65) Prior Publication Data
US 2015/0229779 A1 Aug. 13, 2015

(51) Int. Cl.
*H04L 12/16* (2006.01)
*H04M 15/00* (2006.01)
(Continued)

(52) U.S. Cl.
CPC .......... *H04M 15/64* (2013.01); *H04M 15/28* (2013.01); *H04M 15/30* (2013.01); *H04M 15/43* (2013.01);
(Continued)

(58) Field of Classification Search
CPC ...... H04M 15/64; H04M 15/28; H04M 15/30; H04M 15/43; H04M 15/48; H04M 15/93;
(Continued)

(56) References Cited

U.S. PATENT DOCUMENTS

2007/0026857 A1 2/2007 Kotzin
2009/0264097 A1 10/2009 Cai et al.
(Continued)

FOREIGN PATENT DOCUMENTS

EP 2 007 065 A1 12/2008
WO WO 02/37870 A2 5/2002
(Continued)

OTHER PUBLICATIONS

International Search Report and Written Opinion dated Jun. 17, 2014 corresponding to International Patent Application No. PCT/EP2012/068724.
(Continued)

*Primary Examiner* — Abdelnabi O Musa
(74) *Attorney, Agent, or Firm* — Squire Patton Boggs (US) LLP

(57) ABSTRACT

A mechanism for a user equipment is described. The mechanism comprises allocating a secure memory area, wherein said secure memory area being inaccessible by a user of the user equipment; generating an charging identifier relating to proximity communication involving the user equipment; collecting proximity service charging data during the proximity communication; storing the charging identifier and the proximity service charging data in the secure memory area.

17 Claims, 9 Drawing Sheets

(51) Int. Cl.
  H04M 15/28  (2006.01)
  H04M 15/30  (2006.01)
  H04W 4/24   (2009.01)
  H04W 4/02   (2009.01)

(52) U.S. Cl.
  CPC .......... H04M 15/48 (2013.01); H04M 15/93 (2013.01); H04W 4/023 (2013.01); H04W 4/24 (2013.01); H04M 15/44 (2013.01); H04M 15/8083 (2013.01)

(58) Field of Classification Search
  CPC ....... H04M 4/023; H04M 4/24; H04W 4/023; H04W 4/24
  See application file for complete search history.

(56) References Cited

U.S. PATENT DOCUMENTS

| | | | |
|---|---|---|---|
| 2010/0093342 | A1 | 4/2010 | Ramachandra Rao et al. |
| 2010/0190469 | A1* | 7/2010 | Vanderveen ............ H04L 12/14 455/406 |
| 2010/0197268 | A1 | 8/2010 | Raleigh |
| 2013/0288668 | A1* | 10/2013 | Pragada ................ H04W 12/06 455/426.1 |
| 2014/0073285 | A1* | 3/2014 | Lehane ................... H04W 4/26 455/406 |
| 2015/0087233 | A1* | 3/2015 | Kim ...................... H04W 4/008 455/41.2 |
| 2015/0142986 | A1* | 5/2015 | Reznik ................... H04L 67/16 709/228 |

FOREIGN PATENT DOCUMENTS

| | | |
|---|---|---|
| WO | WO 03/030484 A1 | 4/2003 |
| WO | WO 2013/163599 A2 | 10/2013 |

OTHER PUBLICATIONS

3GPP TR 22.803 V0.2.0 (Feb. 2012), Technical Specification, 3rd Generation Partnership Project; Technical Specification Group SA; Feasibility Study for Proximity Services (ProSe) (Release 12), Apr. 19, 2012, XP050637149, 17 pages.
3GPP TR 23.815 V2.0.0 (Mar. 2002), Technical Specification, 3rd Generation Partnership Project; Technical Specification Group Services and System Aspects; Charging implications of IMS architecture (Release 5), Mar. 31, 2002, XP040278830, 23 pages.
Qualcomm Incorporated et al., "Requirements associated with Proximity-based Multiplayer Gaming Use Case S1-113013," 3GPP TSG-SA WG1 Meeting #56, S1-113014, San Francisco, CA, Nov. 14-18, 2011, 2 pages.
3GPP TR 32.240 V11.5.0 (Sep. 2012), Technical Specification, 3rd Generation Partnership Project; Technical Specification Group Services and System Aspects; Telecommunication management; Charging management; Charging Architecture and principles (Release 11), Sep. 2012, 44 pages.
3GPP TR 32.251 V11.4.0 (Sep. 2012), Technical Specification, 3rd Generation Partnership Project; Technical Specification Group Services and System Aspects; Telecommunication management; Charging management; Packet Switched (PS) domain charging (Release 11), Sep. 2012, 89 pages.
B. Aboba et al., "The Network Access Identifier," Network Working Group, RFC 4282, Dec. 2005, 16 pages.
3GPP TR 23.003 V11.2.0 (Jun. 2012), Technical Specification, 3rd Generation Partnership Project; Technical Specification Group Core Network and Terminals; Numbering, addressing and identification (Release 11), Jun. 2012, 83 pages.
3GPP TS 24.008 V11.4.0 (Sep. 2012), Technical Specification, 3rd Generation Partnership Project; Technical Specification Group Core Network and Terminals; Mobile radio interface Layer 3 specification; Core network protocols; Stage 3 (Release 11), Sep. 2012, 672 pages.
3GPP TS 32.298 V11.4.0 (Sep. 2012), Technical Specification, 3rd Generation Partnership Project; Technical Specification Group Services and System Aspects; Telecommunication management; Charging management; Charging Data Record (CDR) parameter description (Release 11), Sep. 2012, 147 pages.
3GPP TS 23.401 V11.3.0 (Sep. 2012), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 11), Sep. 2012, 283 pages.
3GPP Ts 32.299 V11.5.0 (Sep. 2012), Technical Specification, 3rd Generation Partnership Project; Technical Specification Group Services and System Aspects; Telecommunication management; Charging management; Diameter charging applications (Release 11), Sep. 2012, 151 pages.
Qualcomm Incorporated et al., "Proximity Network Offload Use Case," 3GPP TSG-SA WG1 Meeting #56, S1-113015 San Francisco, CA, Nov. 14-18, 2011, 2 pages.

* cited by examiner

PROXIMITY SERVICE CHARGING

FIELD OF THE INVENTION

The present invention relates to proximity service charging. More specifically, the present invention relates to methods, apparatuses, system and computer program product for charging proximity service between user equipments.

BACKGROUND OF THE INVENTION

In a traditional LTE (Long Term Evolution) communication system as shown in FIG. 1, traffic (e.g. user plane data) originated from one user equipment (UE), e.g. UE1, goes through an eNB (evolved Node B) and GWs (GateWays) in an operator's network before reaching another UE, e.g. UE2. Uu is an interface between a UE and an eNB. Naturally, a user is charged when using service provided by the operator. Charging is a functional entity within the communication system.

In general term, there are two charging mechanisms in a communication network, i.e. online charging and offline charging.

In offline charging, the resource usage is reported from the network to the Billing Domain (BD) after the resource usage has occurred. It is a process where charging information for network resource usage is collected concurrently with that resource usage. The charging information is then passed through a chain of logical charging functions. At the end of this process, CDR (Charging Data Record) files are generated by the network, which are then transferred to the network operator's BD for the purpose of subscriber billing and/or inter-operator accounting (or additional functions, e.g. statistics, at the operator's discretion).

The BD typically comprises post-processing systems such as the operator's billing system or billing mediation device. In conclusion, offline charging is a mechanism where charging information does not affect, in real-time, the service rendered.

In online charging, a subscriber account, located in an Online Charging System (OCS), is queried prior to granting permission to use the requested network resource(s). It is a process where charging information for network resource usage is collected concurrently with that resource usage in the same fashion as in offline charging. However, authorization for the network resource usage must be obtained by the network prior to the actual resource usage to occur. This authorization is granted by the OCS upon request from the network. When receiving a network resource usage request, the network assembles the relevant charging information and generates a charging event towards the OCS in real-time. The OCS then returns an appropriate resource usage authorization. The resource usage authorization may be limited in its scope (e.g. volume of data or duration); therefore the authorization may have to be renewed from time to time as long as the user's network resource usage persists. Note that the charging information utilized in online charging is not necessarily identical to the charging information employed in offline charging. In summary, online charging is a mechanism where charging information can affect, in real-time, the service rendered and therefore a direct interaction of the charging mechanism with the control of network resource usage is required.

Moreover, offline and online charging may be performed simultaneously and independently for the same chargeable event.

In a proximity service scenario, communication may happen between UEs directly as shown in FIG. 2. An operator can move the data path (user plane) off the access and core networks to direct links between UEs, which is called "direct mode" data path. Alternatively, data path may be locally routed via a proximate eNB as depicted in FIG. 3. Such communication mode is called "local mode".

In an envisaged scenario, Mary, owners of Store A and Restaurant A, B and C are subscribed to an operator service which allows them to use proximity service. There might be hundreds of other stores/restaurants with the capability of proximity service in the vicinity of Mary. When Mary walks into a neighbourhood of Store A, she may be notified of the proximity of Store A. Mary then may decide to look for a restaurant, and thus (e.g. following interaction with certain application of her UE) may be notified of the proximity of Restaurant A. Mary may not be notified of the proximity of other establishment not found of interest according to the application being used. After she starts walking towards Restaurant B, Mary may be notified of the proximity of Restaurant B, and also of Restaurant C.

In such scenario, UEs are using LTE spectrum for data transmission, it is therefore reasonable that the usage period may be considered in an operator billing system. In another situation, terminal-to-terminal communication, either directly or locally, may be used by operator to offload the traffic in their network when necessary. Thus, there is a need to seek certain means to charge the use of proximity service.

SUMMARY OF THE INVENTION

The present invention and its embodiments seek to address one or more of the above-described issues.

According to an exemplary first aspect of the invention, there is provided a method for a user equipment comprising allocating a secure memory area, wherein said secure memory area being inaccessible by a user of the user equipment; generating an charging identifier relating to proximity communication involving the user equipment; collecting proximity service charging data during the proximity communication; storing the charging identifier and the proximity service charging data in the secure memory area.

According to one modification of the invention, the method for a user equipment further comprises sending the proximity service charging data together with the charging identifier to a network element.

According to another aspect of the invention, there is provided a method for a first apparatus comprising receiving a message comprising an indication of local path proximity communication from a user equipment, wherein said user equipment attempting to be involved in the proximity communication via the first apparatus; generating a charging identifier based an identity of the user equipment; collecting proximity service charging data during the proximity communication; and sending the proximity service charging data together with the charging identifier to a network element after the proximity communication ends.

According to a third aspect of the invention, there is provided a method for a second apparatus comprising receiving a message comprising a first charging identifier relating to proximity communication involving a user equipment, proximity service charging data and a second charging identifier concerning a normal charging event in relation to the user equipment; correlating the first charging identifier with the second charging identifier; generating a bill in relation to the user equipment by taking into account the proximity communication.

According to a fourth aspect of the invention, there is provided a user equipment comprising a processor configured to allocate a secure memory area, wherein said secure memory area being inaccessible by a user of the user equipment; generate a charging identifier relating to proximity communication involving the user equipment; collect proximity service charging data during the proximity communication; and store the charging identifier and the proximity service charging data in the secure memory area.

According to further development of the invention, said processor of the user equipment is further configured to send the proximity service charging data together with the charging identifier to a network element via a transmitter of said user equipment.

According to a fifth aspect of the invention, there is provided a first apparatus comprising a receiver configured to receive a message comprising an indication of local path proximity communication from a user equipment, wherein said user equipment attempting to be involved in the proximity communication via the first apparatus; a processor configured to generate a charging identifier based an identity of the user equipment, collect proximity service charging data during the proximity communication, and send the proximity service charging data together with the charging identifier to a network element via a transmitter of said first apparatus after the proximity communication ends.

According to a sixth aspect of the invention, there is provided a second apparatus comprising a receiver configured to receive a message comprising a first charging identifier relating to proximity communication involving a user equipment, proximity service charging data and a second charging identifier concerning a normal charging event in relation to the user equipment; a processor configured to correlate the first charging identifier with the second charging identifier, and to generate a bill in relation to the user equipment by taking into account the proximity communication.

According to a seventh aspect of the invention, there is provided a computer program product for a user equipment comprising means for allocating a secure memory area, wherein said secure memory area being inaccessible by a user of the user equipment; means for generating an charging identifier relating to proximity communication involving the user equipment; means for collecting proximity service charging data during the proximity communication; means for storing the charging identifier and the proximity service charging data in the secure memory area.

According to an eighth aspect of the invention, there is provided a computer program product for a first apparatus comprising means for receiving a message comprising an indication of local path proximity communication from a user equipment, wherein said user equipment attempting to be involved in the proximity communication via the first apparatus; means for generating a charging identifier based an identity of the user equipment; means for collecting proximity service charging data during the proximity communication; and means for sending the proximity service charging data together with the charging identifier to a network element after the proximity communication ends.

According to a ninth aspect of the invention, there is provided a computer program product for a second apparatus comprising means for receiving a message comprising a first charging identifier relating to proximity communication involving a user equipment, proximity service charging data and a second charging identifier concerning a normal charging event in relation to the user equipment; means for correlating the first charging identifier with the second charging identifier; means for generating a bill in relation to the user equipment by taking into account the proximity communication.

According to one embodiment of the invention, said charging identifier or the first charging identifier comprises an IMEI or an IP address of said user equipment.

According to another embodiment of the invention, said charging identifier or the first charging identifier comprises a 32-bit number, wherein said 32-bit number incrementing after each switching-on of the user equipment and being stored at non-volatile memory of the user equipment after each incrementing.

Embodiments of the present invention may have one or more of following advantages.

The invention described in the application makes it possible collect charging data for proximity communication, either between two user equipments directly or via an eNB. Moreover, the invention proposes to associate proximity service charging records with charging records relating to a normal charging event of a UE. Such correlation makes it possible to take into account proximity service charging when producing a bill for packet data service. A subscriber may, for example, get certain discount from packet data service if certain amounts of data are transmitted via proximity service.

BRIEF DESCRIPTION OF THE DRAWINGS

Exemplary embodiments of the invention are described below, by way of example only, with reference to the following numbered drawings.

DESCRIPTION OF THE EMBODIMENTS OF THE INVENTION

Figure 1:
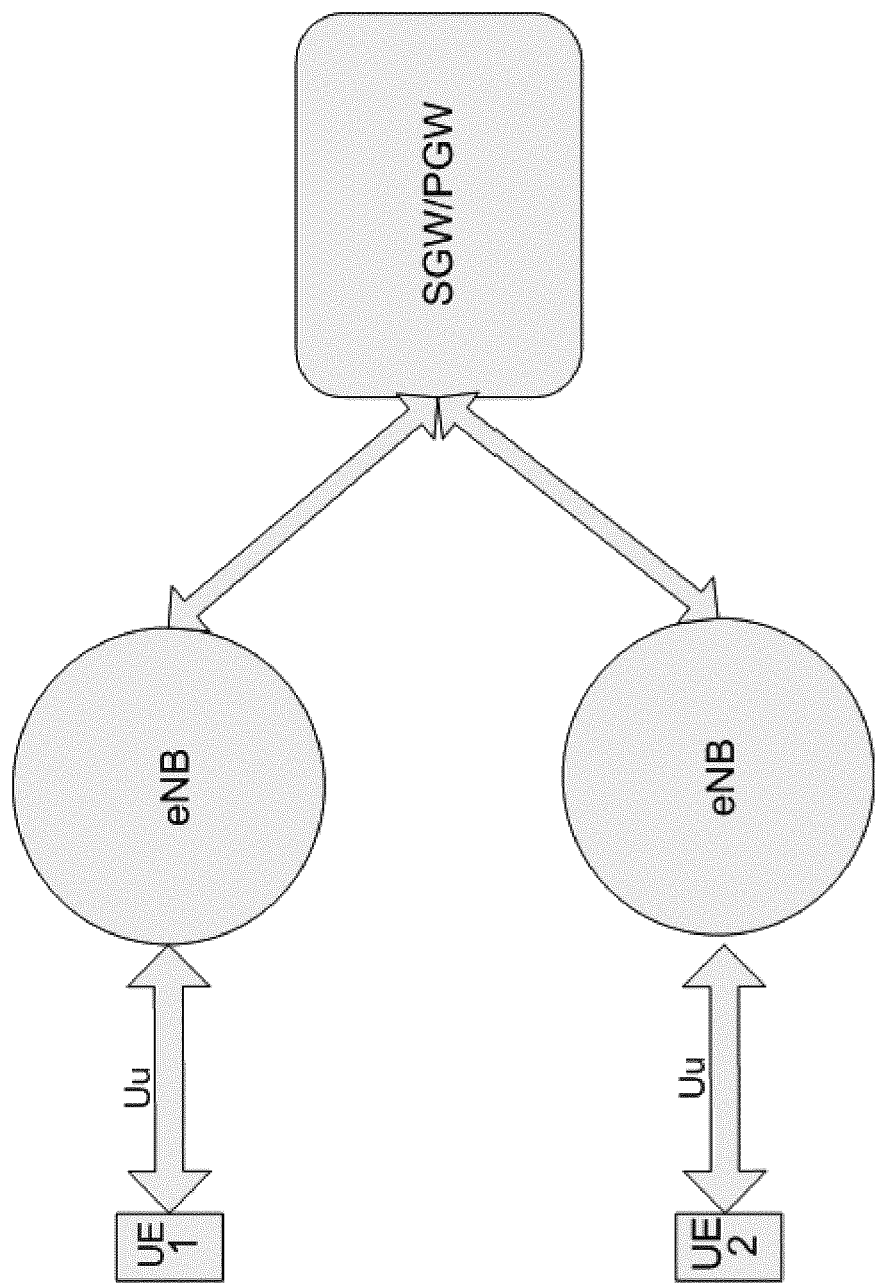
FIG. 1 gives an overview of traffic flow in a traditional LTE communication network
Figure 2:
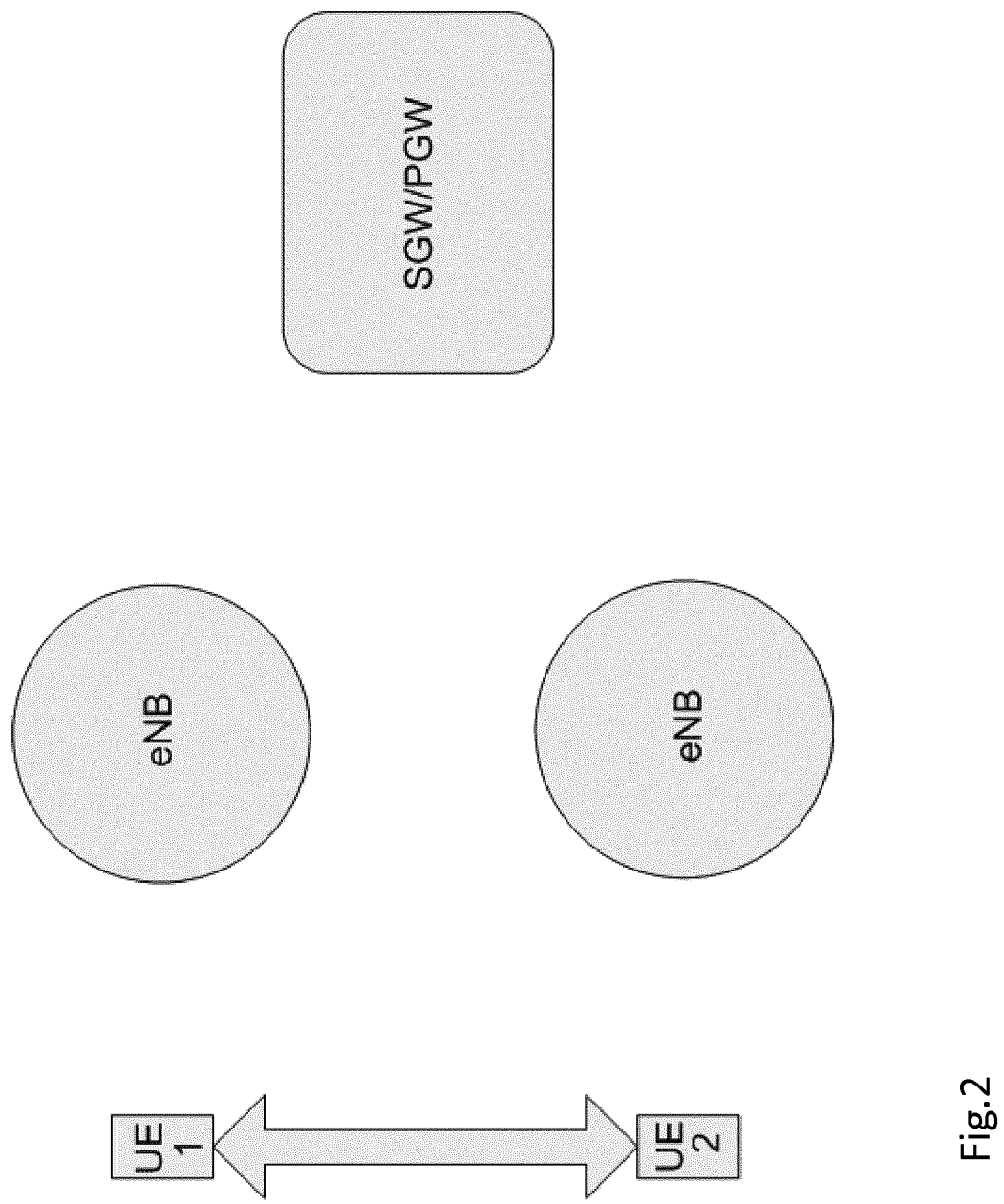
FIG. 2 illustrates traffic flow in proximity communication—direct path
Figure 3:
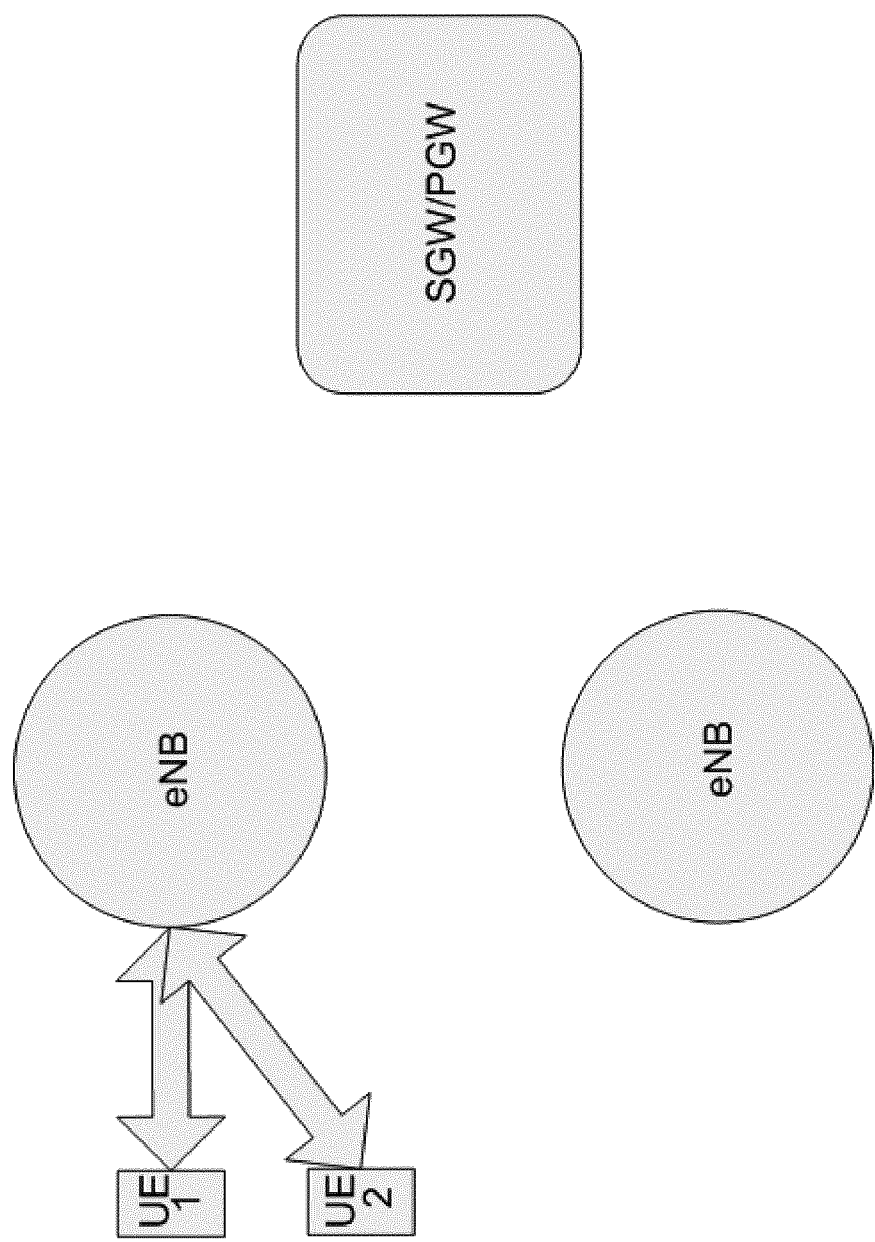
FIG. 3 illustrates traffic flow in proximity communication—local path
Figure 4:
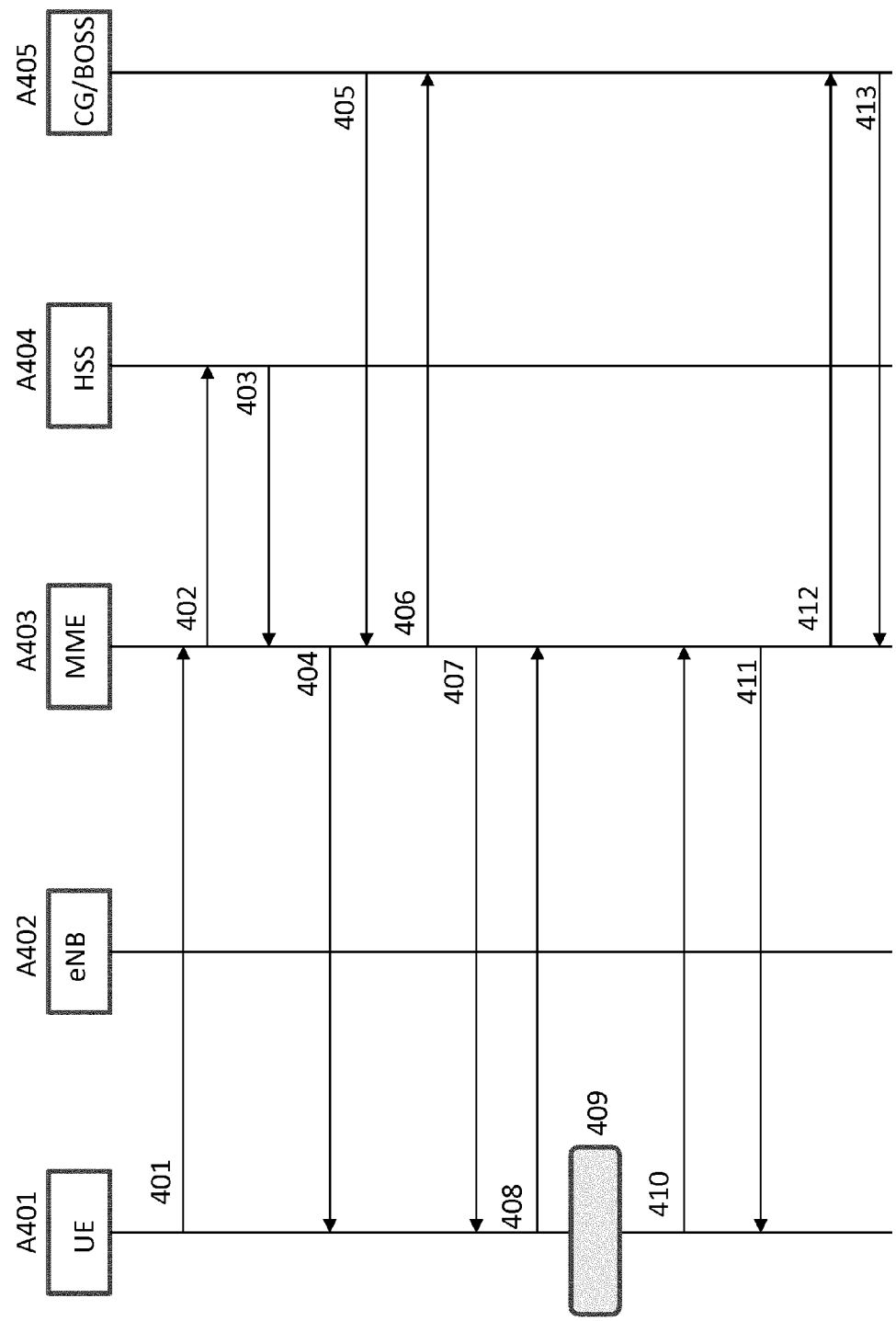
FIG. 4 shows signaling flow according to one aspect of the invention.

FIG. 4 shows signaling flow according to one aspect of the invention. A UE A401 may send a message 401 to a MME (Mobile Management Entity) A403. The message 401 may be a LTE attach message indicating proximity communication capability of the UE A401. The MME A403 may forward the received message to a HSS (Home Subscriber Server) A404 at step 402. The HSS A404 may send a response 403, e.g. update location ACK, to the MME A403. The response message 403 may comprise subscription data of the UE (e.g. UE A401) that initiated the attach message 401. The MME A403 may send a second response 404 to the UE A401, indicating that proximity communication is allowed.

Assuming a third party, e.g. a store, a restaurant in the above-mentioned scenario or another UE, may try to connect the UE A401 via direct path proximity communication. A BOSS (Business and Operation Support System) A405 may send a second message 405, for instance a proximity service charging request, to the MME A403 for the purpose of initiating charging the impending proximity communication session. The BOSS A405 may also comprise a CG (Charging Gateway) according to one embodiment of the invention. Upon receiving the second message 405, the MME A403 may send a third response 406 to the BOSS A405 to acknowledge the charging request 405. The MME A403 may forward the second message to the UE A401 at step 407. The UE A401 may acknowledge the request at step 408.

Then proximity communication may start at step 409. The UE A401 may allocate a secure memory area and collect proximity service charging data comprising at least one or more of the followings: activation/deactivation of proximity service, proximity service mode ("direct" or "local"), initiation/termination, starting time, end time, service usage time, duration, total data volume. Optionally, the collected data may also comprise location information (e.g. cell ID), diagnostics (e.g. reason for ending the proximity service session), local record sequence number, ID of another UE involved in the proximity communication session, Radio Access Type (RAT), etc. A secure memory area means that a user of the UE A401 cannot access or modify any data stored in that area. The UE A401 may store the proximity service charging data in the secure memory area.

After the proximity communication session ends, the UE A401 may send a proximity service charging report 410 comprising the collected proximity service charging data mentioned above and a proximity service charging ID to the MME A403. The proximity charging ID may be generated by a UE, such as UE A401, and comprise IMEI (International Mobile Equipment Identity) or IP address (Internet Protocol) of the UE A401. The MME A403 may acknowledge the receipt of the report at step 411 and forward the report to the BOSS A405 at step 412. Upon receiving the proximity service charging report, the BOSS A405 may send a response 413 to the MME A403.

Figure 5:
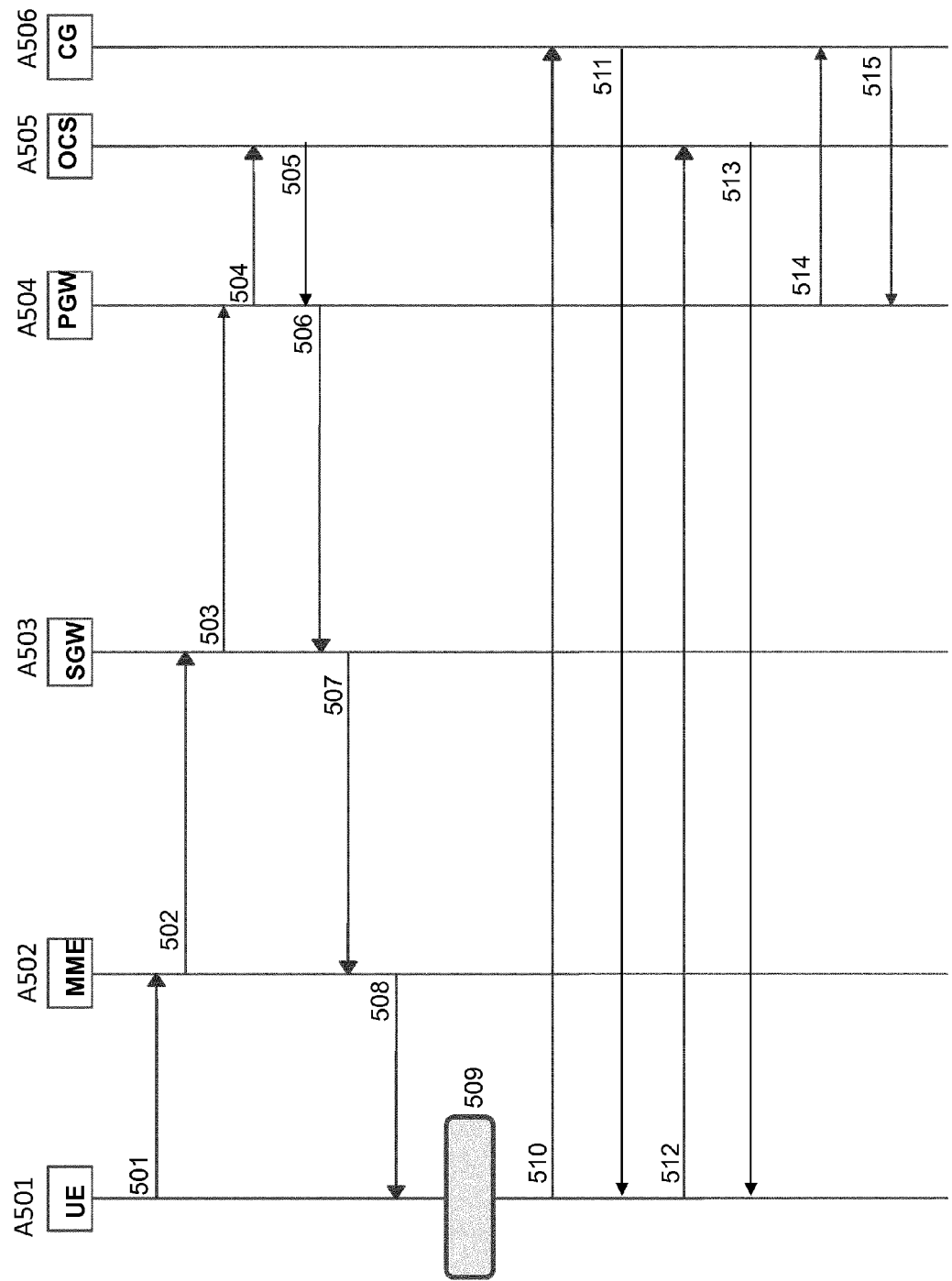
FIG. 5 shows signaling flow according to another aspect of the invention.

FIG. 5 shows signaling flow according to another aspect of the invention. A UE A501 may send a message (e.g. an attach request) 501 comprising a proximity service charging ID (PCI) generated in the UE A501 to a MME A502. The PCI may be a combination of IMEI and a unique 32-bits sequence number within the UE. If the UE does not have IMEI, e.g. a WLAN device, then MAC address may be used instead. The 32-bits sequence number may be any 32-bits number with an initial value, e.g. 0, stored a non-volatile memory of the UE A501. When the UE starts, the 32-bits sequence number may be updated e.g. by adding 1, and stored again in the UE.

The MME A502 may send another message (e.g. create session request) 502 comprising the PCI to a SGW (Serving Gateway) A503. The SGW A503 may send a third message (e.g. another create session request) 503 comprising the PCI to a PGW/PDN-GW (Packet Data Network Gateway) A503. The PGW/PDN-GW may be a GGSN (Gateway GPRS Support Node) according to one embodiment of the invention. GPRS stands for General Packet Radio Service.

The PGW A503 may send a fourth message (e.g. a Credit Control Request) 504 comprising the PCI and a PSCI (Packet Switched Charging ID) which is generated in PGW to an OCS (Online Charging System) A505. The PSCI is not relevant to proximity service, but generally concerns a charging event associated with a user/subscriber.

Generally speaking, each charging domain has its own charging identifier. Correlation of charging information between different charging domains may be needed and may be done based on charging identifiers. Proximity service may have its own charging domain which is different from PS (Packet Switched) charging domain.

The OCS A505 may issue a response 505 to acknowledge the request 504. The PGW A503 may send another response (e.g. create session response message) 506 comprising the PSCI to the SGW A503. The SGW A503 may send a third response (e.g. another create session response message) 507 comprising the PSCI to the MME A502. The MME A502 may send a fourth response (e.g. an attach accept message) 508 comprising the PSCI to the UE A501. The UE A501 may store the PSCI and comprise it when generating charging records, Then the proximity communication session may happen at step 509 and the UE A501 may allocate a secure memory area and collect proximity service charging data relating to the proximity communication, such as activation/deactivation of proximity service, proximity service mode ("direct" or "local"), initiation/termination, start time, end time, service usage time, duration, total data volume, and etc. Optionally, the collected proximity service charging data may also comprise location information (e.g. cell ID), diagnostics (e.g. reason for ending the proximity service session), local record sequence number, ID of another UE involved in the proximity communication session, Radio Access Type (RAT), etc. The collected proximity service charging data together with PCI may be stored in the secure memory area of the UE A501. A user of the UE A501 cannot access or modify any data stored in the secure memory area.

According to one embodiment of the invention, offline charging system is used. After the proximity communication session ends, the UE A501 may send a message (e.g. Data Record Transfer Request) 510 comprising PSCI, PCI and the collected charging data to a CG (Charing Gateway) A506. The CG A506 may give a fifth response 511 to the UE A501 after receipt of the message 510.

According to another embodiment of the invention, online charging system is used.

The UE A501 may also send a sixth message, e.g. credit control request, 512 comprising the PSI, PSCI and the collected charging data to an OCS (Online Charging System) A505. The OCS A505 may acknowledge the receipt of the message 512 as shown in step 513.

Upon receiving the third message 503, the PGW A504 may send a fifth message 514 comprising charging data record, which concerns normal charging events of a UE, e.g. UE A501, not relevant to proximity communication, and PSCI from PS domain to the CG A506. The CG A506 may send a fifth response 515 to acknowledge the receipt of the message 514.

Either CG A506 or OCS A505 may correlate PSCI with PCI, in other words, associating the PS charging records with the proximity service charging records. Such correlation makes it possible to take into account proximity service charging when producing a bill for packet data service. A subscriber may, for example, get certain discount from packet data service if certain amounts of data are transmitted via proximity communication.

As mentioned previously, offline and online charging may be performed simultaneously and independently for the same chargeable event, such as proximity communication.

Figure 6:
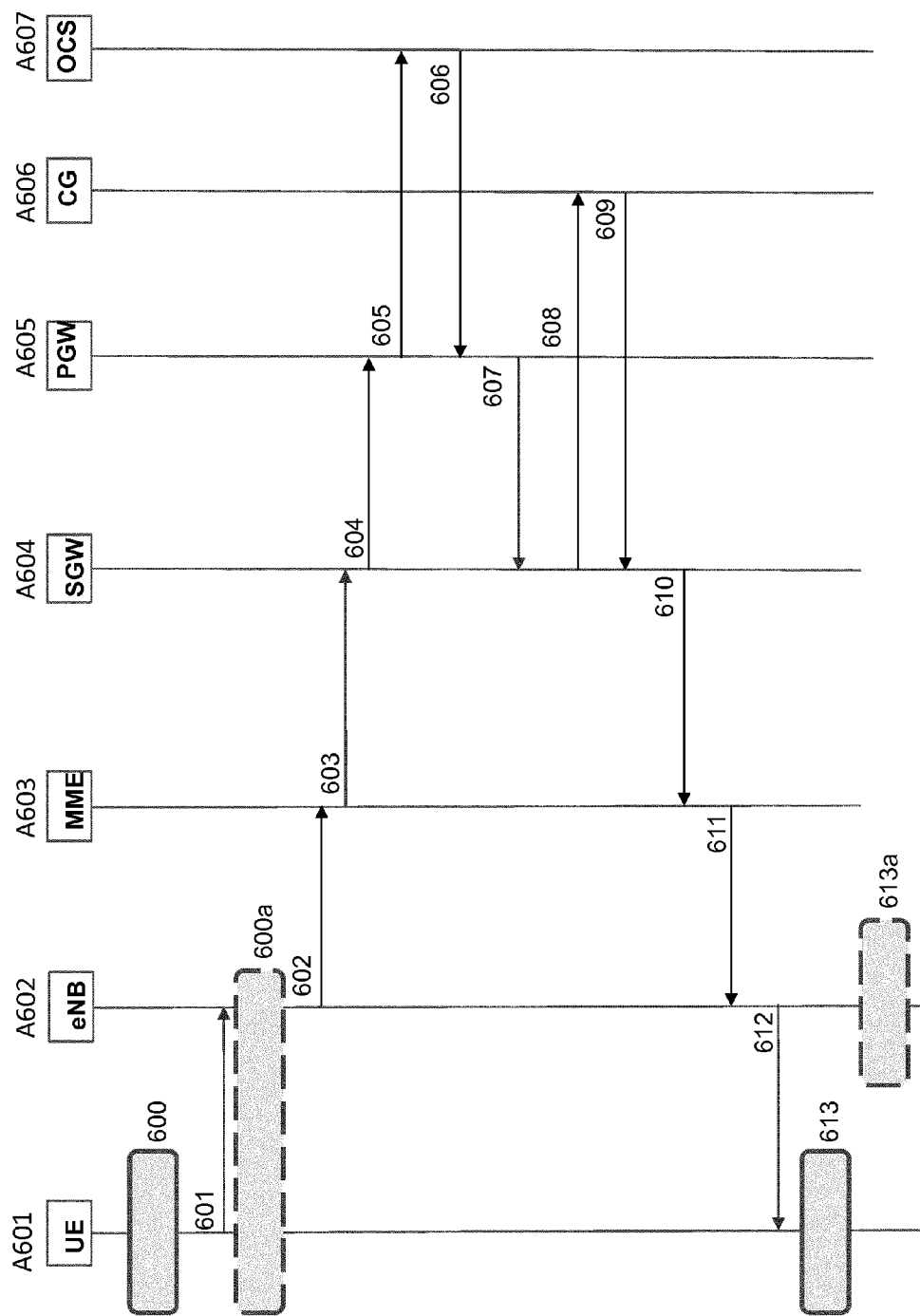
FIG. 6 shows signaling flow according to a third aspect of the invention.

FIG. 6 shows signaling flow according to a third aspect of the invention.

According to one embodiment of the invention, proximity communication is performed in direct path mode, i.e. without access to the mobile network, at step 600. A UE, for example UE A601, which is involved in the proximity communication, may allocate a secure memory area and collect PSInfo (Proximity Service Information) that may comprise a charging identification of the service user and at least one or more of the followings: activation/deactivation of proximity service, proximity service mode ("direct" or "local"), initiation/termination, proximity service starting time, proximity service end time, service usage time, proximity service duration and proximity service data volume. Optionally, PSInfo may also comprise location information (e.g. cell ID), diagnostics (e.g. reason for ending the proximity service session), local record sequence number, ID of another UE involved in the proximity communication session, Radio Access Type (RAT), etc. The charging identification of the service user may be based on the IP (Internet Protocol) address, e.g. WLAN device or MAC address or an IMEI of an UE. The PSinfo may be stored in the secure memory area, i.e. non-user accessible memory area in a UE.

After the proximity communication ends, the UE, e.g. UE A601, which was involved in the proximity communication, may send a first message 601, e.g. an attach request, comprising the PSInfo to an eNB A602. The eNB A602 may send a second message 602 comprising the PSInfo to a MME A603. The MME A603 may send a third message 603 comprising the PSInfo to a SGW A604 and the SGW A604 may send a fourth message 604 comprising the PSInfo to a PGW A605. The PGW A605 may send a fifth message 605 comprising the PSInfo to an OCS A607. Rating control in OCS may evaluate the received PSinfo data and convert this non-monetary units in the CCR command to monetary units, and then account control in OCS may deduce the calculated amount of monetary units from subscribers credit balance or adjust the tariff for the packet core access in conjunction with the proximity service usage, e.g. bonus for user with less or more proximity service usage. The OCS A607 may send a first response 606 to the PGW A605 upon receipt of the fifth message 605. The PGW A605 may send a second response 607 (e.g. create session response message) to the SGW A604 to acknowledge the fourth message 604. The SGW A604 may send a sixth message (e.g. an accounting request command) 608 comprising the received PSInfo to a CG (Charging Gateway) A606 in order to deliver PSInfo to CG for offline charging, in addition to online charging. The CG may transform PSInfo into CDR files to the operators BD. Optionally, the PGW A605 may also send/receive similar messages as 608&609 to/from the CG A606 just like the SGW A604.

The CG A606 may give a third response 609 to the SGW A604 after receiving the message 608. The SGW A604 may give a fourth response 610 to the MME A603 and the MME A603 may give a fifth response 611 to the eNB A602. The eNB A602 may give a sixth response (e.g. an attach accept message) 612 to the UE A601 to acknowledge the receipt of the first message 601. Upon receiving the sixth response 612, the UE A601 may reset all the parameters of PSInfo as shown in step 613.

According to another embodiment of the invention, the proximity communication is performed in local path mode, i.e via an eNB, for instance the eNB A602, as shown in 600a. In this situation, the UE A601 may send the first message 601 (e.g. an attach request) comprising an indication of local path proximity communication. The eNB A602 should already know the identity (e.g. IMEI or IP address) of the UE A601 and the subscriber during the preceding procedures when the UE A601 is admitted to the network. A charging identifier may be generated by the eNB A602 in the similar way as in the UE A601, which has been described already. Optionally, the UE A601 may also comprise a charging identifier generated by itself in the first message 601 just as in the case of direct path. The eNB A602 may collect the PSInfo instead and send PSInfo together with the charging identifier, either received or generated by itself, to a network element, e.g. a MME A603.

The rest of the procedures are the same as in the case of direct path except the step 613. After sending the response 612 to the UE A601, the eNB A602 may reset all the parameters of PSInfo in step 613a.

Alternatively, the UE A601 may collect the PSInfo as well, just as the direct path situation mentioned above.

Figure 7:
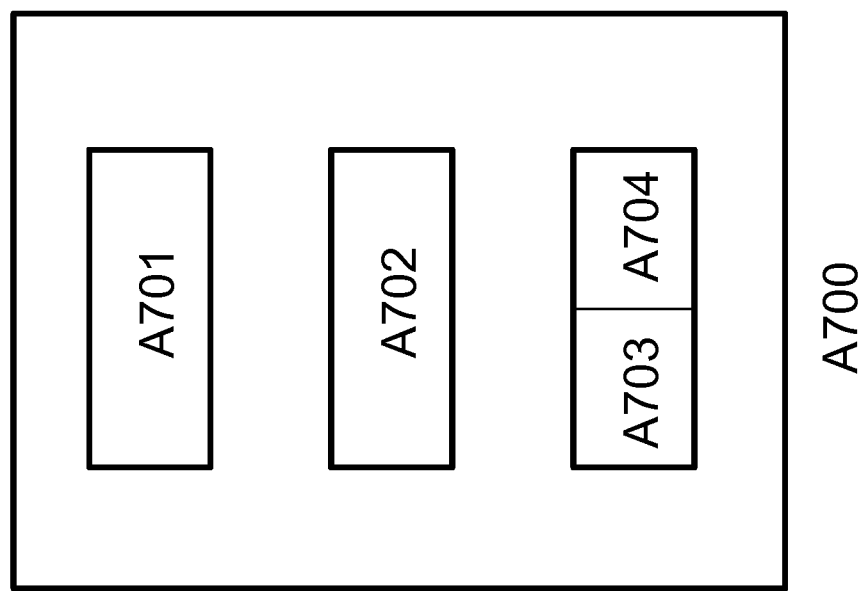
FIG. 7 depicts a schematic block diagram illustrating an apparatus.

FIG. 7 shows a schematic block diagram illustrating an apparatus A700 according to a fourth aspect of the invention. The apparatus A700 may comprise a processor (or a processing means) A701, a memory unit A702 comprising a secure memory area which is not accessible by a user of the apparatus, a transmitter (or a transmitting means) A703 and a receiver (or receiving means) A704. It may be noted that the receiver or transmitter may be an integral transceiver or separate functional entities. The apparatus A700 may be a user equipment such as A401, A501 or A601.

According to one embodiment of the invention, the processor A701 of the apparatus A700 may send a message (e.g. 401), via the transmitter A703, to a network element e.g. the MME A403, indicating proximity communication capability of the apparatus A700. Through the receiver A704, the processor A701 may receive a response message (e.g. 404), indicating that proximity communication is allowed. Through the receiver A704, the processor A701 may receive a message for requesting proximity service charging (e.g. 407). The processor A701 may acknowledge the received message via the transmitter A703.

The processor A701 may generate a proximity service charging ID comprising IMEI (International Mobile Equipment Identity) or IP address (Internet Protocol) of the apparatus A700. The proximity service charging ID may be a combination of IMEI and a unique 32-bits sequence number within the UE. If the UE does not have IMEI, e.g. a WLAN device, then MAC address or IP address may be used instead. The 32-bits sequence number may be any 32-bits number with an initial value, e.g. 0, stored in a non-volatile memory of the UE A501. When the UE starts, the 32-bits sequence number may be updated, e.g. by adding 1, and stored again in the UE.

The processor A701 may allocate a secure memory area in the memory unit A702 of the apparatus A700. The secure memory area is not accessible by the user of the apparatus A700. The processor A701 may collect proximity service charging related data comprising e.g. activation/deactivation of proximity service, proximity service mode, initiation/termination, starting time, end time, service usage time, duration, total data volume during proximity communication. Optionally, collected charging data may also comprise location information (e.g. cell ID), diagnostics (e.g. reason for ending the proximity service session), local record sequence number, ID of another UE involved in the proximity communication session, Radio Access Type (RAT), etc. The processor A701 may store the proximity service charging data and proximity service charging ID in the secure memory area and send these data to a network element, for example A403, A506, A505, A602.

According to another embodiment of the invention, the processor A701 may send the generated proximity service charging ID to a network element, for example A502 or A602. The processor A701 may also receive PSCI from the network element A502 via its receiver A704 and comprise it when generating a charging report.

Figure 8:
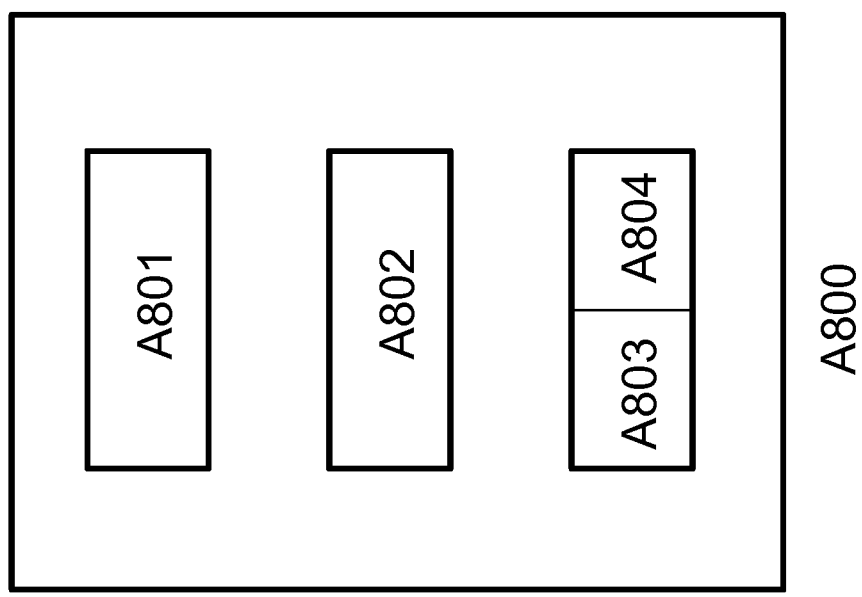
FIG. 8 depicts a schematic block diagram illustrating another apparatus.

FIG. 8 shows a schematic block diagram illustrating an apparatus A800 according to a fifth aspect of the invention. The apparatus A800 may comprise a processor (or a processing means) A801, a memory unit A802, a transmitter (or a transmitting means) A803 and a receiver (or receiving means) A804. It may be noted that the receiver or transmitter may be an integral transceiver or separate functional entities. The apparatus A800 may be an eNB such as A602.

According to one embodiment of the invention, through the receiver A804, the processor A801 of the apparatus A800 may receive a message (e.g. 601) comprising an indication of local path proximity communication from a UE, e.g. A601. A charging identifier may be generated by the processor A801 based on the IP (Internet Protocol) address, e.g. WLAN device or MAC address or an IMEI of the UE A601 or comprised in the received message 601. The processor A801 may collect proximity charging data comprising e.g. activation/deactivation of proximity service, proximity service mode, initiation/termination, starting time, end time, service usage time, duration, total data volume during the proximity communication. Optionally, collected charging data may also comprise location information (e.g. cell ID), diagnostics (e.g. reason for ending the proximity service session), local record sequence number, ID of another UE involved in the proximity communication session, Radio Access Type (RAT), etc. After the proximity communication session is complete, the processor A801 may send a message (e.g. 602) comprising the collected proximity service charging data together with the charging identifier, either received or generated by itself, of the service user to a network element (e.g. A603) via the transmitter A803. The processor A801 may reset all the parameters of PSInfo after the receipt of a response message (e.g. 611) from the network element A603.

Figure 9:
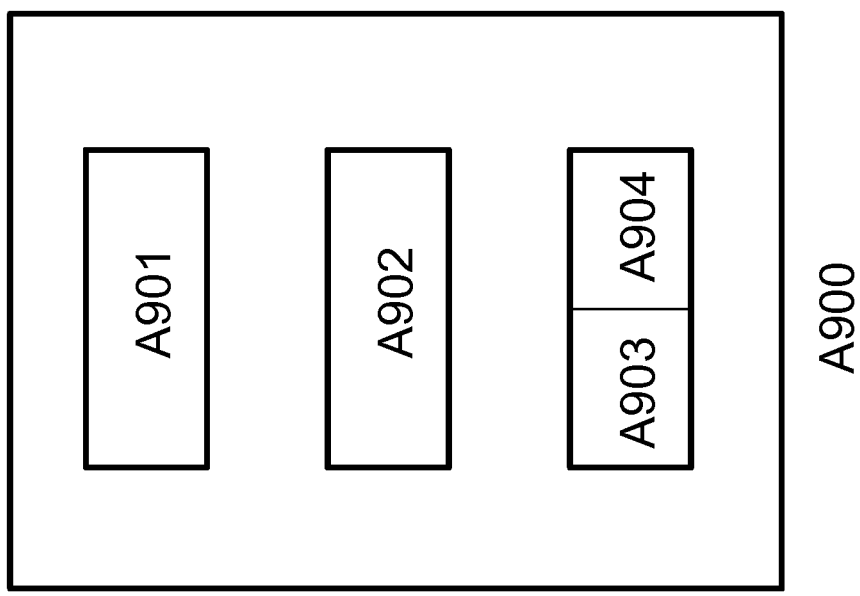
FIG. 9 depicts a schematic block diagram illustrating a third apparatus.

FIG. 9 shows a schematic block diagram illustrating an apparatus A900 according to a sixth aspect of the invention. The apparatus A900 may comprise a processor (or a processing means) A901, a memory unit A902, a transmitter (or a transmitting means) A903 and a receiver (or receiving means) A904. It may be noted that the receiver or transmitter may be an integral transceiver or separate functional entities. The apparatus A900 may be a charging gateway, such as A506, or an online charging system, e.g. A505.

According to one embodiment of the invention, through the receiver A904, the processor A901 of the apparatus A900 may receive a message (e.g. 510, 512) comprising a first charging identifier, a second charging identifier and proximity charging data record. The first charging identifier, such as PCI, is a charging identifier relating to proximity communication concerning a user/subscriber. The second charging identifier, e.g. PSCI, is not relevant to any proximity service, but generally concerns a charging event associated with the same user/subscriber.

The processor A901 may correlate the first charging identifier with the second charging identifier so that the proximity communication may be taken into account when generating a bill for charging a subscriber's packet data service. For example, some discount may be applied if certain amounts of data are transmitted via proximity service.

For the purpose of the present invention as described above, it should be noted that

- method steps likely to be implemented as software code portions and being run using a processor at one of the server entities are software code independent and can be specified using any known or future developed programming language;
- method steps and/or devices likely to be implemented as hardware components at one of the server entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices can be implemented as individual devices, but this does not exclude that they are implemented in a distributed fashion throughout the system, as long as the functionality of the device is preserved.

It is to be understood that the above description is illustrative of the invention and is not to be construed as limiting the invention. Various modifications, applications and/or combination of the embodiments may occur to those skilled in the art without departing from the scope of the invention as defined by the appended claims.

The invention claimed is:

1. A method for a user equipment comprising:
    allocating a secure memory area, wherein said secure memory area being inaccessible by a user of the user equipment;
    generating a charging identifier relating to proximity communication involving the user equipment;
    collecting proximity service charging data during the proximity communication;
    storing the charging identifier and the proximity service charging data in the secure memory area;
    creating a service charging report to charge for the use of the proximity communication, the service charging report comprising the collected proximity service charging data and the charging identifier; and
    sending the proximity service charging data together with the charging identifier to a network element.

2. The method according to claim 1, said charging identifier comprises an International Mobile Equipment Identity (IMEI) or an IP address of the user equipment.

3. The method according to claim 2, said charging identifier comprises a 32-bit number, wherein said 32-bit number incrementing after each switching-on of the user equipment and being stored at non-volatile memory of the user equipment after each incrementing.

4. A method for a first apparatus comprising:
    receiving a message comprising an indication of local path proximity communication from a user equipment, wherein said user equipment attempting to be involved in the proximity communication via the first apparatus;
    generating a charging identifier based an identity of the user equipment;
    collecting proximity service charging data during the proximity communication;
    sending the proximity service charging data together with the charging identifier to a network element after the proximity communication ends; and forwarding the charging identifier together with proximity service charging data to an online charging system to initiate conversion of the proximity service charging data to monetary units.

5. A method for a second apparatus comprising:
receiving a message comprising a first charging identifier relating to proximity communication involving a user equipment, proximity service charging data and a second charging identifier unrelated to proximity communication concerning a normal charging event in relation to the user equipment;
correlating the first charging identifier with the second charging identifier; and
generating a bill in relation to the user equipment by taking into account the proximity communication.

6. The method according to claim 5, said first charging identifier comprises an International Mobile Equipment Identity (IMEI) or an IP address of the user equipment.

7. The method according to claim 6, said first charging identifier comprises a 32-bit number, wherein said 32-bit number incrementing after each switching-on of the user equipment and being stored at non-volatile memory of the user equipment after each incrementing.

8. A user equipment comprising:
a processor configured to
allocate a secure memory area, wherein said secure memory area being inaccessible by a user of the user equipment;
generate a charging identifier relating to proximity communication involving the user equipment;
collect proximity service charging data during the proximity communication;
store the charging identifier and the proximity service charging data in the secure memory area;
create a service charging report to charge for the use of the proximity communication, the service charging report comprising the collected proximity service charging data and the charging identifier; and
send the proximity service charging data together with the charging identifier to a network element via a transmitter of said user equipment.

9. The user equipment according to claim 8, said charging identifier comprises an International Mobile Equipment Identity (IMEI) or an IP address of the user equipment.

10. The user equipment according to claim 9, said charging identifier comprises a 32-bit number, wherein said 32-bit number incrementing after each switching-on of the user equipment and being stored at non-volatile memory of the user equipment after each incrementing.

11. A first apparatus comprising:
a receiver configured to receive a message comprising an indication of local path proximity communication from a user equipment, wherein said user equipment attempting to be involved in the proximity communication via the first apparatus;
a processor configured to
generate a charging identifier based an identity of the user equipment, collect proximity service charging data during the proximity communication,
send the proximity service charging data together with the charging identifier to a network element via a transmitter of said first apparatus after the proximity communication ends, and
forward the charging identifier together with proximity service charging data to an online charging system to initiate conversion of the proximity service charging data to monetary units.

12. A second apparatus comprising:
a receiver configured to receive a message comprising a first charging identifier relating to proximity communication involving a user equipment, proximity service charging data and a second charging identifier unrelated to proximity communication concerning a normal charging event in relation to the user equipment;
a processor configured to correlate the first charging identifier with the second charging identifier, and
to generate a bill in relation to the user equipment by taking into account the proximity communication.

13. The second apparatus according to claim 12, said first charging identifier comprises an International Mobile Equipment Identity (IMEI) or an IP address of the user equipment.

14. The second apparatus according to claim 13, said first charging identifier comprises a 32-bit number, wherein said 32-bit number incrementing after each switching-on of the user equipment and being stored at non-volatile memory of the user equipment after each incrementing.

15. A computer program for a user equipment, the computer program embodied on a non-transitory computer readable medium, the computer program, when executed by a processor, causes the processor at least to:
allocate a secure memory area, wherein said secure memory area being inaccessible by a user of the user equipment;
generate a charging identifier relating to proximity communication involving the user equipment;
collect proximity service charging data during the proximity communication;
store the charging identifier and the proximity service charging data in the secure memory area;
create a service charging report to charge for the use of the proximity communication, the service charging report comprising the collected proximity service charging data and the charging identifier; and
send the proximity service charging data together with the charging identifier to a network element.

16. A computer program for a first apparatus comprising, the computer program embodied on a non-transitory computer readable medium, the computer program, when executed by a processor, causes the processor at least to:
receive a message comprising an indication of local path proximity communication from a user equipment, wherein said user equipment attempting to be involved in the proximity communication via the first apparatus;
generate a charging identifier based an identity of the user equipment;
collect proximity service charging data during the proximity communication;
send the proximity service charging data together with the charging identifier to a network element after the proximity communication ends; and
forward the charging identifier together with proximity service charging data to an online charging system to initiate conversion of the proximity service charging data to monetary units.

17. A computer program for a second apparatus, the computer program embodied on a non-transitory computer readable medium, the computer program, when executed by a processor, causes the processor at least to:
receive a message comprising a first charging identifier relating to proximity communication involving a user equipment, proximity service charging data and a second charging identifier unrelated to proximity communication concerning a normal charging event in relation to the user equipment;

correlate the first charging identifier with the second charging identifier; and generate a bill in relation to the user equipment by taking into account the proximity communication.

* * * * *